US012761314B2

(12) United States Patent
Yang et al.

(10) Patent No.: US 12,761,314 B2
(45) Date of Patent: Oct. 13, 2026

(54) RADAR STRUCTURE

(71) Applicant: WHETRON ELECTRONICS CO., LTD., New Taipei City (TW)

(72) Inventors: Chia-Feng Yang, New Taipei City (TW); Ming-Hwa Lee, New Taipei City (TW)

(73) Assignee: WHETRON ELECTRONICS CO., LTD., New Taipei City (TW)

( * ) Notice: Subject to any disclaimer, the term of this patent is extended or adjusted under 35 U.S.C. 154(b) by 237 days.

(21) Appl. No.: 18/757,568

(22) Filed: Jun. 28, 2024

(65) Prior Publication Data

US 2025/0355078 A1 Nov. 20, 2025

(30) Foreign Application Priority Data

May 15, 2024 (TW) ................................ 113117953

(51) Int. Cl.
*G01S 7/03* (2006.01)
*G01S 7/02* (2006.01)
*G01S 7/40* (2006.01)

(52) U.S. Cl.
CPC .............. *G01S 7/032* (2013.01); *G01S 7/028* (2021.05); *G01S 7/40* (2013.01)

(58) Field of Classification Search
CPC . G01S 7/032; G01S 7/028; G01S 7/40; G01R 1/045; G01R 31/2889
USPC .......................................................... 342/173
See application file for complete search history.

(56) References Cited

U.S. PATENT DOCUMENTS

| | | | | |
|---|---|---|---|---|
| 9,608,383 B2 * | 3/2017 | Stokoe | H01R 43/18 |
| 10,446,985 B2 * | 10/2019 | Ooi | H01R 13/6471 |
| 10,673,142 B2 * | 6/2020 | Ueda | H01Q 21/29 |
| 10,910,706 B2 * | 2/2021 | Hung | H05K 1/023 |
| 10,950,961 B2 * | 3/2021 | Lai | H01R 12/7005 |
| 11,043,738 B2 * | 6/2021 | Yu | H01Q 9/28 |
| 11,342,659 B2 * | 5/2022 | Wittmann | H01Q 1/32 |
| 11,681,014 B2 * | 6/2023 | Kim | G01S 13/931 342/70 |

(Continued)

FOREIGN PATENT DOCUMENTS

| | | | |
|---|---|---|---|
| CN | 209559710 U | 10/2019 | |
| CN | 220172375 U * | 12/2023 | H01Q 1/42 |

(Continued)

*Primary Examiner* — Nuzhat Pervin
(74) *Attorney, Agent, or Firm* — WPAT, PC

(57) ABSTRACT

A radar includes a radome, a circuit board, a shielding cover, and an encapsulation cover. The radome includes a receiving space and a wave transmitting face. The circuit board is received in the receiving space. The circuit board includes a first surface having an antenna area and facing the wave transmitting face. The circuit board further includes a second surface having a connection region. The shielding cover is disposed over the second surface of the circuit board and includes an opening region aligned with the connection region. The encapsulation cover includes at least one connecting element which is electrically connected to the connection region via the opening region. At least one testing element is aligned with and electrically connected to the connection region via the opening region to perform a radar test. Thus, the manufacturing cost is saved, and the testing efficiency is enhanced.

9 Claims, 7 Drawing Sheets

(56) References Cited

U.S. PATENT DOCUMENTS

| | | | | |
|---|---|---|---|---|
| 11,768,270 | B2 * | 9/2023 | Cho | G01S 7/4026<br>342/165 |
| 12,117,521 | B2 * | 10/2024 | Roh | H01Q 1/3233 |
| 12,550,304 | B2 * | 2/2026 | Liu | H05K 9/0067 |
| 2008/0068249 | A1 * | 3/2008 | Yaginuma | H01Q 15/0013<br>342/175 |
| 2013/0181859 | A1 * | 7/2013 | Waldschmidt | H01Q 9/0407<br>342/70 |
| 2018/0003754 | A1 * | 1/2018 | Schrattenecker | G01R 29/10 |
| 2019/0229410 | A1 * | 7/2019 | Hung | H01Q 1/421 |
| 2019/0377061 | A1 * | 12/2019 | Kobayashi | H01Q 1/3233 |
| 2020/0256908 | A1 * | 8/2020 | Han | G01R 1/045 |
| 2021/0089089 | A1 * | 3/2021 | Huang | E05D 3/02 |
| 2021/0410344 | A1 * | 12/2021 | Kim | G01S 13/931 |
| 2022/0260674 | A1 * | 8/2022 | Vanwiggeren | G01S 7/4052 |
| 2022/0349988 | A1 * | 11/2022 | Zhou | G01S 7/027 |
| 2023/0178885 | A1 * | 6/2023 | Kim | H01Q 1/3233 |
| 2023/0261369 | A1 * | 8/2023 | John | G01S 7/027<br>342/361 |
| 2024/0201321 | A1 * | 6/2024 | Ma | B60R 16/0231 |

FOREIGN PATENT DOCUMENTS

| | | | | | |
|---|---|---|---|---|---|
| CN | 117368850 | A | | 1/2024 | |
| EP | 3232222 | A1 | * | 10/2017 | H01Q 1/3233 |
| KR | 102536245 | B1 | * | 5/2023 | B60R 21/0134 |
| KR | 20230105977 | A | * | 7/2023 | G01S 7/032 |
| WO | WO-2022222781 | A1 | * | 10/2022 | H04N 23/57 |

* cited by examiner

RADAR STRUCTURE

CROSS REFERENCE TO RELATED APPLICATION

The application claims the benefit of Taiwan Application Serial No. 113117953, filed on May 15, 2024, and the entire contents of which are incorporated herein by reference.

BACKGROUND OF THE INVENTION

1. Field of the Invention

The present invention relates to the technology of packaging and testing of electronic equipment and, more particularly, to a radar permitting rapid test and cost-effective manufacturing, along with a corresponding testing method.

2. Description of the Related Art

The operating principle of radar includes transmitting energy waves to the surrounding space and receiving the energy waves reflected by objects within that in the space. By calculating and analyzing changes in these energy waves, information about the objects, including orientation, distance, movement, and scales, can be obtained. The energy waves can be electromagnetic waves, light waves, sound waves, etc. A typical electromagnetic wave radar transmits and receives electromagnetic waves through an antenna. Various types of antennas may be selected according to the functionalities such as transmission range, installation space, directionality, etc. A patch antenna formed by planar printing is suitable for electronic devices with a limited installation space, such as a radar and a mobile phone. The patch antenna is disposed on a dielectric substrate via multiple planar electrically conductive elements.

A conventional radar structure includes the above-mentioned printed antenna, a circuit board for supplying power and receiving electrical signals, and a radome for protecting the antenna and the electronic components. However, the material, thickness, and shape of the radome, as well as distance between the radome and the surface of the antenna, will affect the antenna's output pattern or cause RF signal attenuation. Consequently, the transmission testing of radar products cannot be limited to the transmission and reception capabilities of the antenna alone. Instead, the product testing should be conducted on the entire radar structure assembly including the radome and the circuit board. However, if the assembled radar structure fails the test, it is difficult to disassemble the final product and, thus, difficult to replace the defective elements, without risking damage to the PCBA or other components. As a result, the entire radar structure is often scrapped, leading to increased manufacturing costs and wasted time.

Therefore, improvements to the conventional radar structure are necessary to address these issues.

SUMMARY OF THE INVENTION

One objective of the present invention is to provide a radar structure that reduces manufacturing cost.

It is another objective of the present invention to provide a radar which can avoid assembling mistake to thereby enhance the product quality.

It is a further objective of the present invention to provide a radar testing method which can improve the efficiency of testing and assembly.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "engagement", "coupling", "assembly", or similar terms is used to include separation of connected members without destroying the members after connection or inseparable connection of the members after connection. A person having ordinary skill in the art would be able to select according to desired demands in the material or assembly of the members to be connected.

In an aspect, a radar according to the present invention includes a radome, a circuit board, a shielding cover, and an encapsulation cover. The radome includes a receiving space and a wave transmitting face. The circuit board is received in the receiving space. The circuit board includes a first surface having an antenna area and facing the wave transmitting face. The circuit board further includes a second surface having a connection region. The shielding cover is disposed over the second surface of the circuit board and includes an opening region aligned with the connection region. The encapsulation cover includes at least one connecting element which is electrically connected to the connection region via the opening region.

In another aspect, a radar according to the present invention includes a radome, a circuit board, and a shielding cover. The radome includes a receiving space and a wave transmitting face. The circuit board is received in the receiving space. The circuit board includes a first surface having an antenna area and facing the wave transmitting face. The circuit board further includes a second surface having a connection region. The shielding cover is disposed over the second surface of the circuit board and includes an opening region aligned with the connection region.

A radar testing method according to the present invention includes: providing a testing tool including at least one testing element; providing a radar having a radome including a receiving space and a wave transmitting face, a circuit board received in the receiving space, with the circuit board including a first surface having an antenna area and facing the wave transmitting face, and with the circuit board further including a second surface having a connection region, and a shielding cover disposed over the second surface of the circuit board, with the shielding cover including an opening region aligned with the connection region; and fixing the radar on the testing tool; and electrically connecting the at least one testing element to the connection region via the opening region and proceeding with a radar test.

Thus, in the radar according to the present invention, the radar semi-product comprised of the radome, the circuit board, and the shielding cover provides the opening region of the shielding cover for direct and electrical connection with the connection region of the circuit board, such that the radar test can be conducted before assembly with the encapsulation cover to form the final radar product. The radar semi-product which has passed the test can continue the assembling operation, whereas the radar semi-product which has failed the test can be disassembled and the components of the radar semi-product can be replaced, thereby avoiding destruction of the circuit board and the connection terminals. This saves the manufacturing cost and enhances the testing and re-processing efficiency. Furthermore, in the radar testing method according to the present invention, by using the testing tool and the testing element to proceed with radar test on the radar semi-product, the data of assembly variation of the radar semi-product can be measured and saved, and the data of assembly variation is the same as that of the final radar product, thereby increasing the radar test efficiency.

In an example, the radome further includes at least one alignment member. The circuit board further includes at least one first alignment portion. The shielding cover further includes at least one second alignment portion. The at least one alignment member is aligned with the at least one first alignment portion and the at least one second alignment portion. Thus, during assembly of the radome, the circuit board, and the shielding cover, the at least one first alignment portion and the at least one second alignment portion are aligned with the at least one alignment member, such that the circuit board and the shielding cover can be installed in the correct position and direction, thereby avoiding assembly errors and increasing manufacturing efficiency.

In an example, the shielding cover further includes at least one first positioning portion. The encapsulation cover further includes at least one second positioning portion. The at least one first positioning portion is aligned with the at least one second positioning portion. Thus, the at least one connecting element of the encapsulation cover may precisely pass through the opening region of the shielding cover and may be correctly and electrically connected to the connection region of the circuit board, providing assembling convenience and avoiding short circuit or open circuit.

In an example, the at least one connecting element includes a first end and a second end. The first end is electrically connected to the connection region. The second end extends in a direction perpendicular to the circuit board. Thus, the at least one connecting element may be confined in the area of the circuit board, thereby saving the installation space of the radar product.

In an example, the at least one connecting element includes a first end and a second end. The first end is electrically connected to the connection region. The second end extends in a direction parallel to the circuit board. Thus, the product installation space planning can be followed to permit design change.

In an example, the at least one connecting element includes a plurality of press-fit terminals. The connection region includes a plurality of through-holes. The plurality of press-fit terminals is inserted into the plurality of through-holes. Thus, the squeezed and deformed press-fit terminals may tightly fit the inner peripheries of the through-holes and securely engage with the through-holes, thereby increasing the assembling stability and reducing the contact resistance.

In an example, the at least one connecting element includes a plurality of pins. The connection region includes a plurality of female connectors. The plurality of pins is inserted into the plurality of female connectors. Thus, the connection region is provided with the plurality of female connectors to permit insertion of the plurality of pins. The pins and the through-holes of the female connectors are heated and pressurized to form metallic coupling, thereby saving the manufacturing cost.

In an example, the radome further includes at least one supporting member. The at least one supporting member contacts with an area of the first surface of the circuit board corresponding to the connection region. The at least one supporting member includes a plurality of recessed structures. Thus, the supporting member assists in uniforming support and stress imparted to the circuit board during insertion of the press-fit terminals, thereby avoiding deformation of the circuit board.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
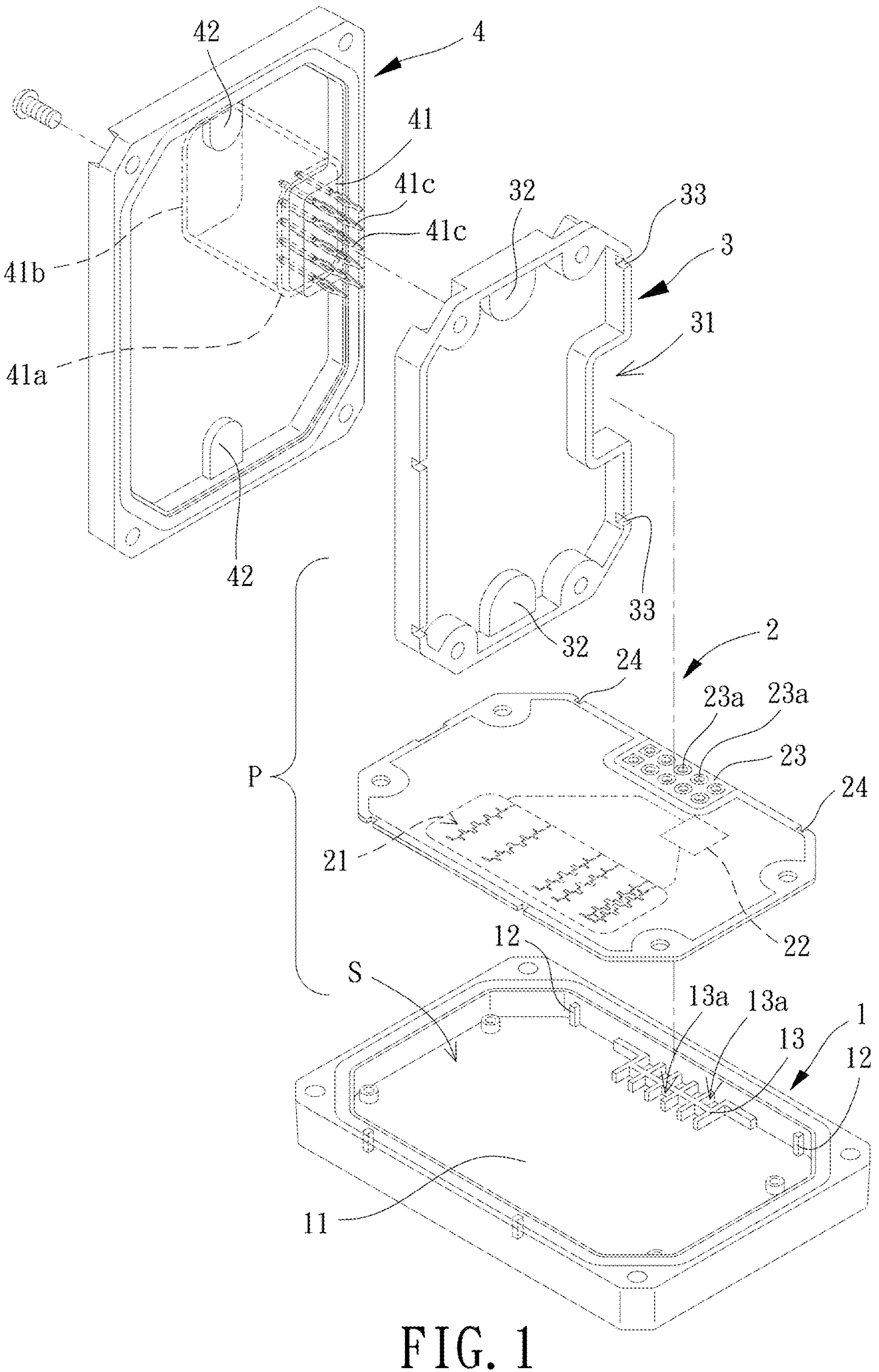
FIG. 1 is an exploded, perspective view of a radar structure of a preferred embodiment according to the present invention.

When the terms “up”, “down”, “top”, “bottom”, “inner”, “outer”, and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Figure 2:
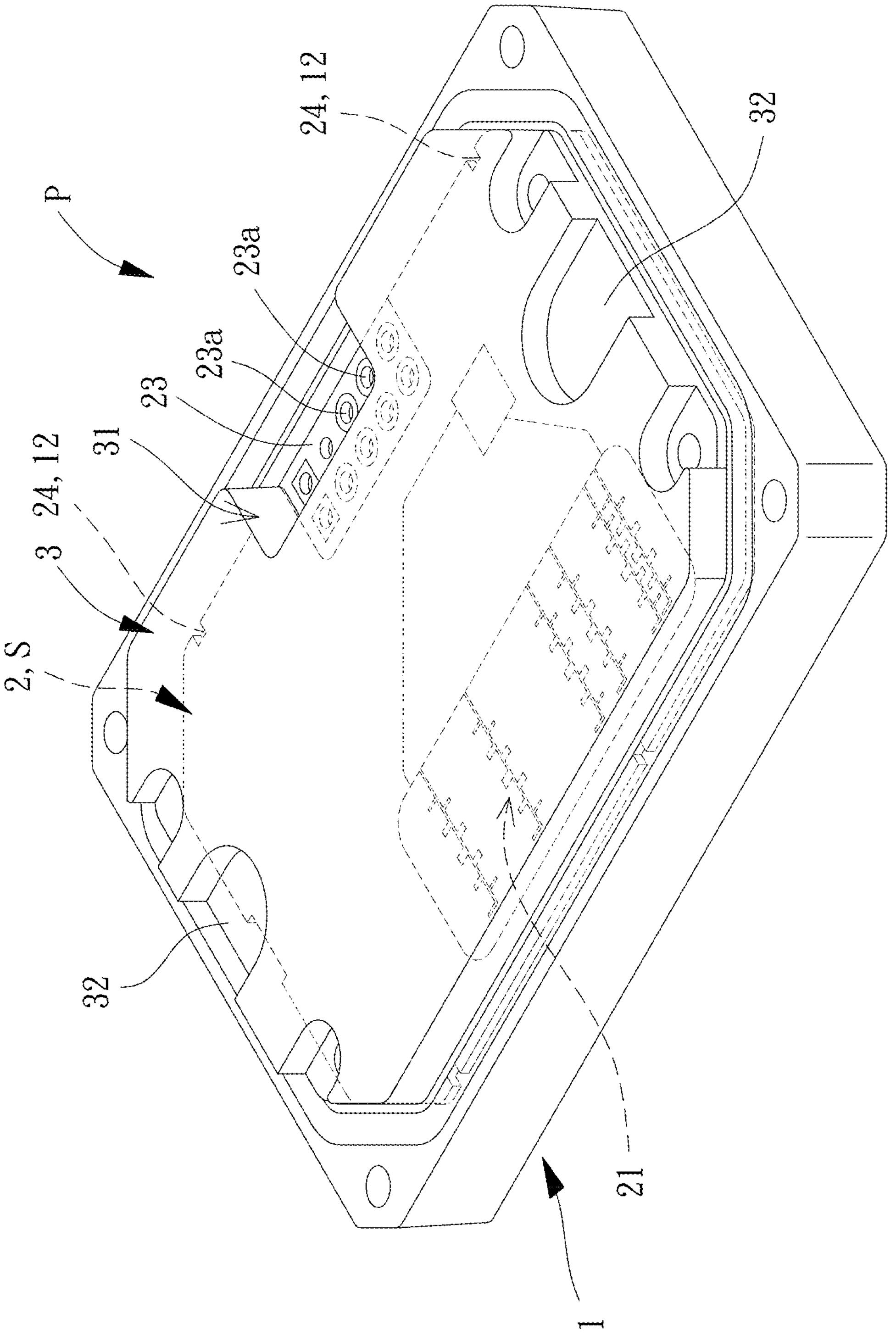
FIG. 2 is a perspective view of a radar semi-product of the preferred embodiment according to the present invention.

With reference to FIGS. 1 and 2, a radar structure of a preferred embodiment according to the present invention comprises a radome 1, a circuit board 2, a shielding cover 3, and an encapsulation cover 4. The circuit board 2 is located between the radome 1 and the shielding cover 3 to constitute a radar semi-product P for performing a radar test. The encapsulation cover 4 is coupled with the radar semi-product P.

The radome 1 may include a half-closed receiving space S. A bottom portion of the receiving space S is a wave transmitting face 11. The wave transmitting face 11 is preferably a uniform and smooth surface and uneven defects, such as dents and skews, are avoided on the wave transmitting face 11. This may reduce the loss of the radar wave transmitting through the wave transmitting face 11. Furthermore, since the radar wave can be reflected by electrically conductive substances and absorbed by water, the material for the radome 1 is preferably electrically non-conductive and waterproof, such as glass, plastics, polystyrene (PS), polybutylene terephthalate (PBT), and glass fiber composite material, which can increase the transmission rate of the radar wave through the radome 1.

The circuit board 2 is received in the receiving space S. The circuit board 2 includes an antenna area 21 located on a first surface of the circuit board 2. The antenna area 21 is facing the wave transmitting face 11 and is used to transmit or receive the radar wave. The circuit board 2 further includes a processing module 22 and a connection region 23. The connection region may be located on a second surface of the circuit board 2, which is opposite to the first surface that has the antenna area 21. The processing module 22 may be located on either surface of the circuit board 2. The processing module 22 includes electrical components and circuits for proceeding with signal processing of the transmitted and received radar wave and may provide power and transmit processed signals through the connection region 23. The connection region 23 is preferably spaced from the components and circuits of the processing module 22. In this embodiment, the connection region 23 is located on an edge of the second surface of the circuit board 2 to avoid being surrounded by the components and circuits of the processing module 22. However, the present invention is not limited in this regard.

The shielding cover 3 is coupled with the radome 1 and envelops the circuit board 2 to protect the antenna area 21 and the processing module 22. The shielding cover 3 includes an opening region 31 aligned with the connection region 23. When the shielding cover 3 covers the processing module 22 over the second surface of the circuit board 2, a plurality of through-holes 23*a* of the connection region 23 is exposed via the opening region 31. Furthermore, the shielding cover 3 may further include at least one first positioning portion 32. In this embodiment, two first positioning portions 32 are respectively located on two opposite sides of the shielding cover 3, and each first positioning portion 32 is a groove structure with a semi-circular section and a linear section. Nevertheless, the present invention is not limited in this regard.

Figure 3:
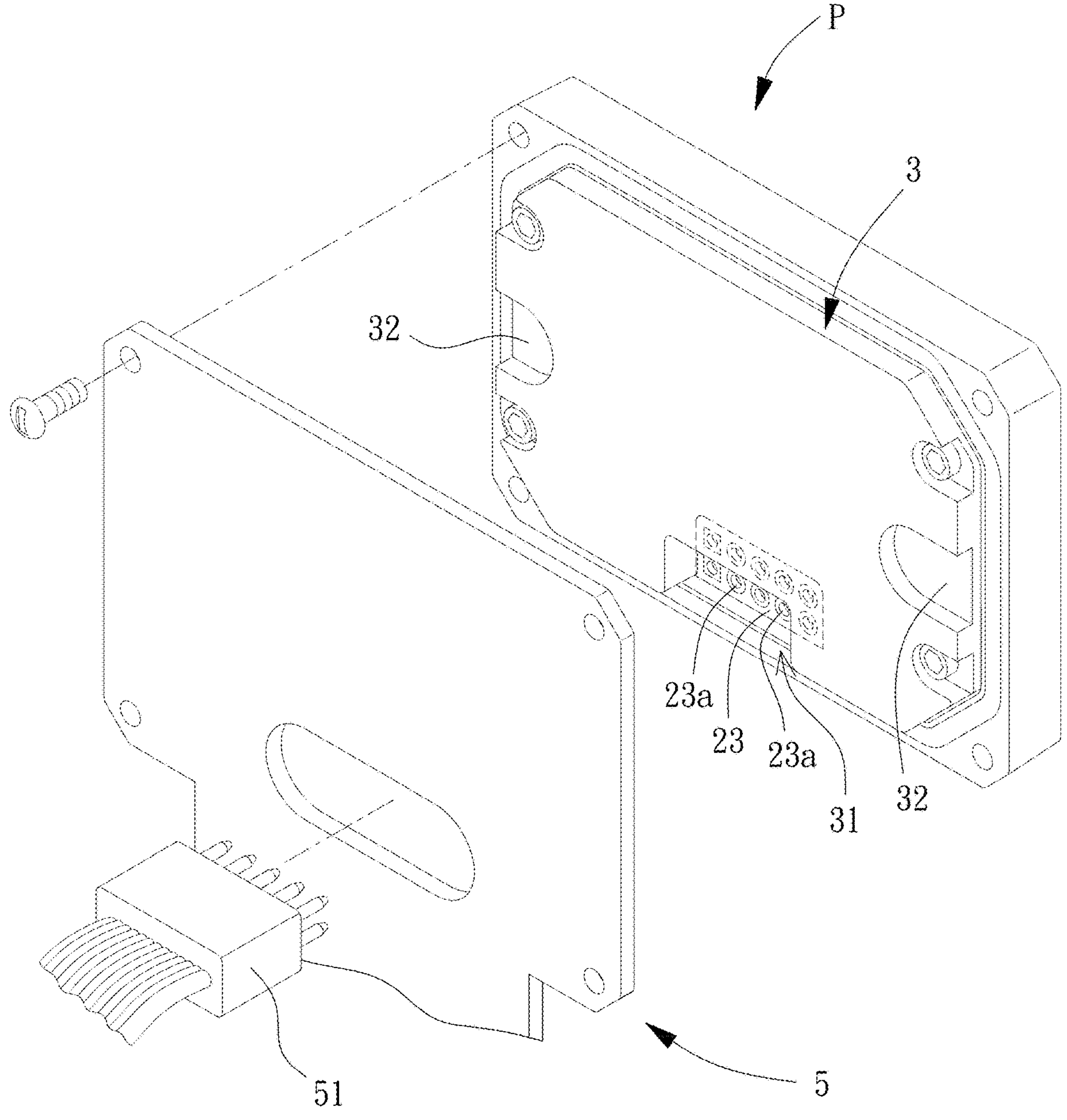
FIG. 3 is a diagrammatic view illustrating testing of the radar structure of the preferred embodiment according to the present invention.
Figure 4:
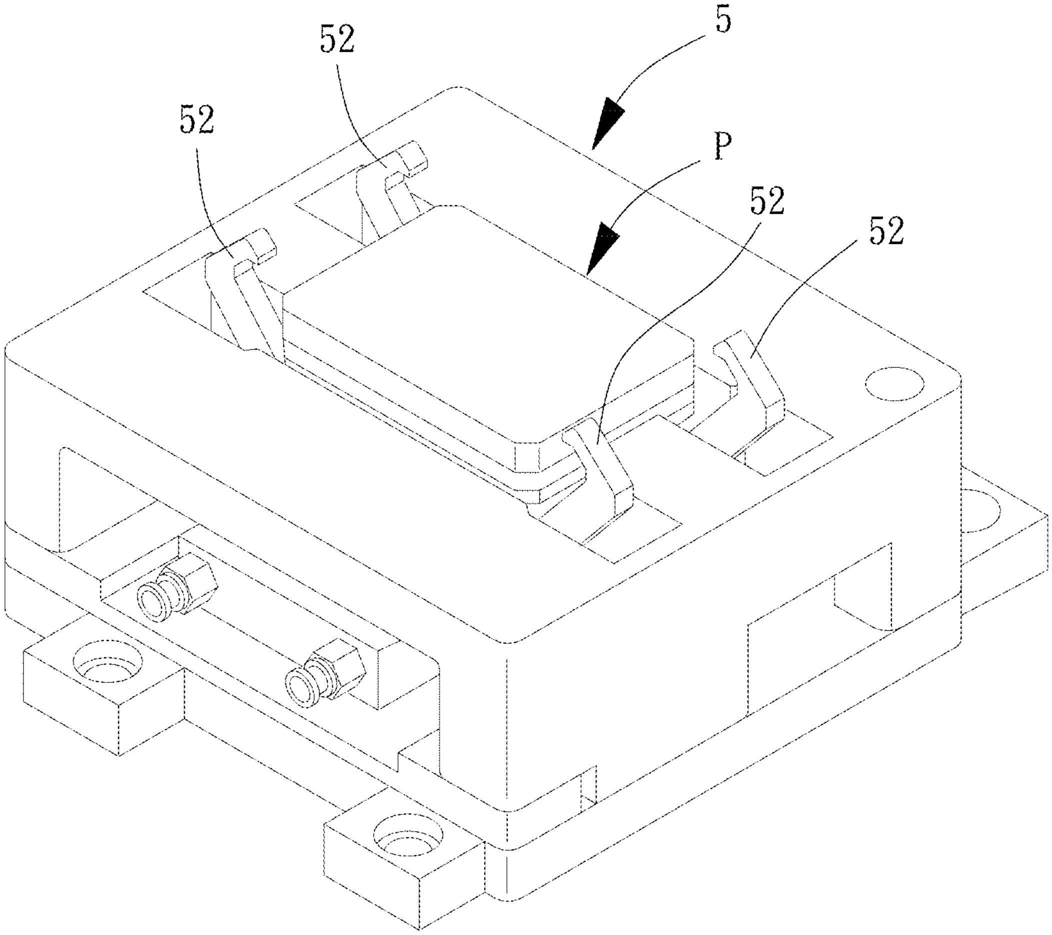
FIG. 4 is a diagrammatic view illustrating testing of a radar structure of another embodiment according to the present invention.

With reference to FIGS. 3 and 4, the radar semi-product P comprised of the radome 1, the circuit board 2, and the shielding cover 3 may be fixed to a testing tool 5. The plurality of through-holes 23*a* of the radar semi-product P is electrically connected to at least one testing element 51 of the testing tool 5 via the plurality of through-holes 23*a* to perform a radar test. As shown in FIG. 3, the testing tool 5 may include a test carrier, and the radar semi-product P may be fixed by a jig (such as screws) onto the test carrier in a radar wave dark room, such that the wave transmitting face 11 of the radome 1 faces an angle reflector spaced from the wave transmitting face 11 by a fixed distance. The test carrier may rotate horizontally and vertically to adjust the testing direction of the radar wave transmitted by the radar semi-product P. As shown in FIG. 4, the testing tool 5 may also include a clamp 52 to clamp and fix corresponding sides of the radar semi-product P by a plurality of claws, and the wave transmitting face 11 faces outward and the connection region 23 is electrically connected inward to the testing tool 5. Nevertheless, the fixing mechanism of the radar semi-product P is not limited to the above examples. The testing tool 5 provides power to enable the radar semi-product P to transmit radar wave in a selected direction. The angle reflector reflects the radar wave, such that the radar semi-product P can proceed with signal processing, and the at least one testing element 51 receives the testing signal. Preferably, wave absorbing materials and electromagnetic wave shielding boards are disposed on the ceiling, walls, and the ground of the radar wave dark room to eliminate ambient electromagnetic interference and to absorb radar wave dissipating away from the testing direction, thereby providing a testing environment which is stable and free of electromagnetic interference. The test result of the radar semi-product P may be used to generate a model and set parameters for the radar product. In a case that the test result does not meet the requirements of the product specification, the radar semi-product P is identified as a defective product and must be scrapped or re-processed, or the components of the radar semi-product P must be replaced.

Figure 5:
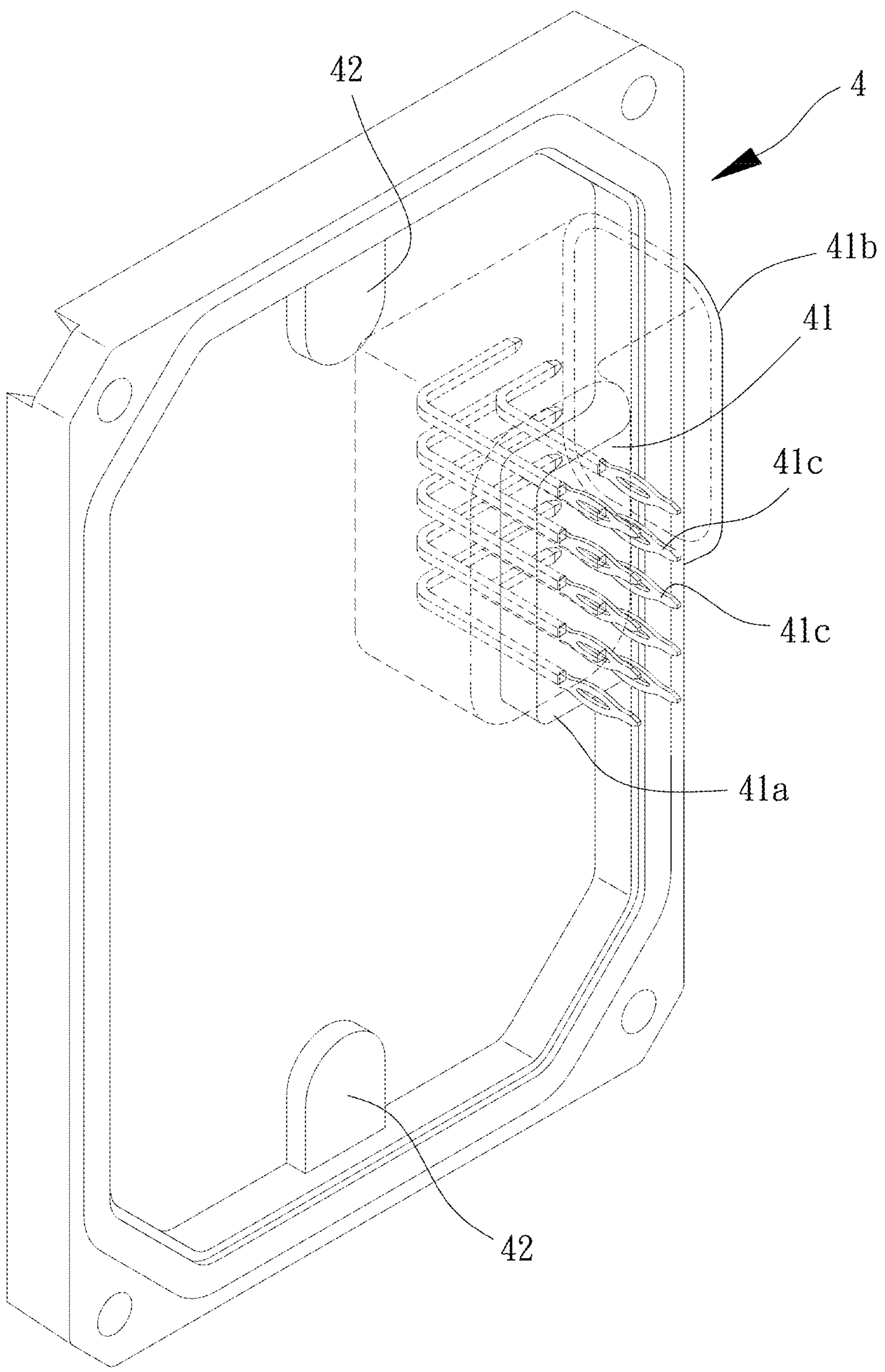
FIG. 5 is an enlarged, perspective view illustrating a connecting element of the radar structure of another embodiment according to the present invention.

With reference to FIGS. 1 and 5, the encapsulation cover 4 is coupled with the radar semi-product P which has passed the radar test. Specifically, the encapsulation cover 4 is coupled with the radome 1 and envelops and protects the circuit board 2 and the shielding cover 3. A connecting element 41 of the encapsulation cover 4 is aligned with the connection region 23. The connecting element 41 may extend through the opening region 31 and is electrically connected to the plurality of through-holes 23*a*. The extending direction of the connecting element 41 passing through the opening region 31 and connected with the plurality of through-holes 23*a* is preferably perpendicular to the circuit board 2. Namely, a first end 41*a* of the connecting element 41 is electrically connected to the connection region 23 and extends to a second end 41*b* opposite to the first end 20*a* in a direction perpendicular to the circuit board 2. Thus, the position of the connecting element 41 can be confined in the area of the circuit board 2, thereby saving the space for installation of the radar product. As shown in FIG. 5, in a case that the space for the client's product is sufficient or in response to the client's need, the extending direction of the connecting element 41 may also be parallel to the circuit board 2. Namely, the extending direction of the second end 41*b* of the connecting element 41 may turn 90 degrees and, thus, be parallel to the circuit board. The extending direction of the connecting element 41 is not limited in the present invention. The encapsulation cover 4 further includes at least one second positioning portion 42 located corresponding to the at least one first positioning portion 32, such that the at least one second positioning portion 42 is aligned and coupled with the at least one first positioning portion 32. At the same time, the connecting element 41 can precisely pass through the opening region 31 and correctly connect with the plurality of through-holes 23*a*. In this embodiment, each of the two second positioning portions 42 is a partially semi-circular and partially rectangular protrusion structure and faces the shielding cover 3. Thus, each of the two second positioning portions 42 can be inserted into the groove structure of a respective one of the two first positioning portions 32 of the shielding cover 3. Nevertheless, the present invention is not limited in this regard.

Figure 6:
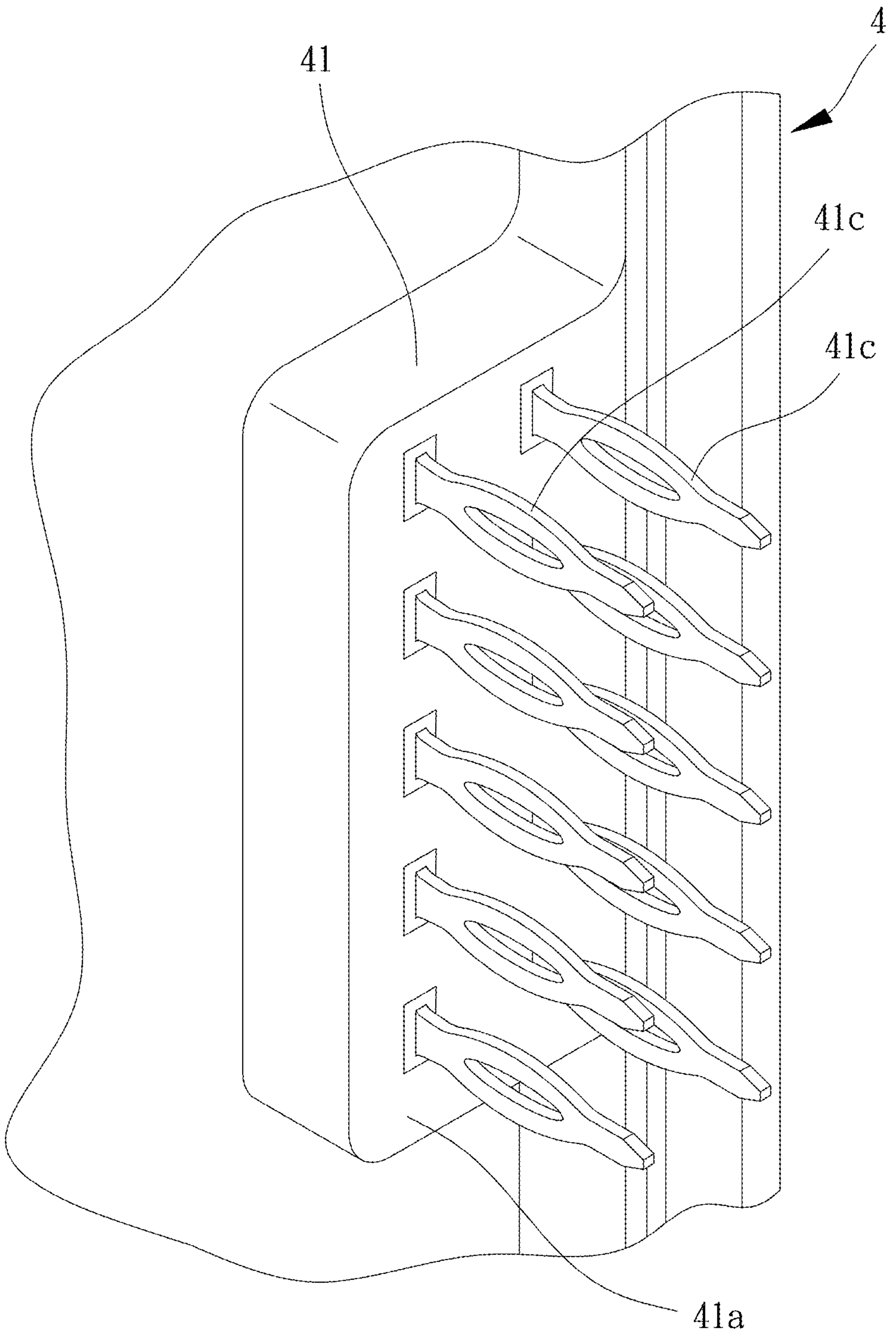
FIG. 6 is an enlarged view of a portion of the radar structure of FIG. 1.
Figure 7:
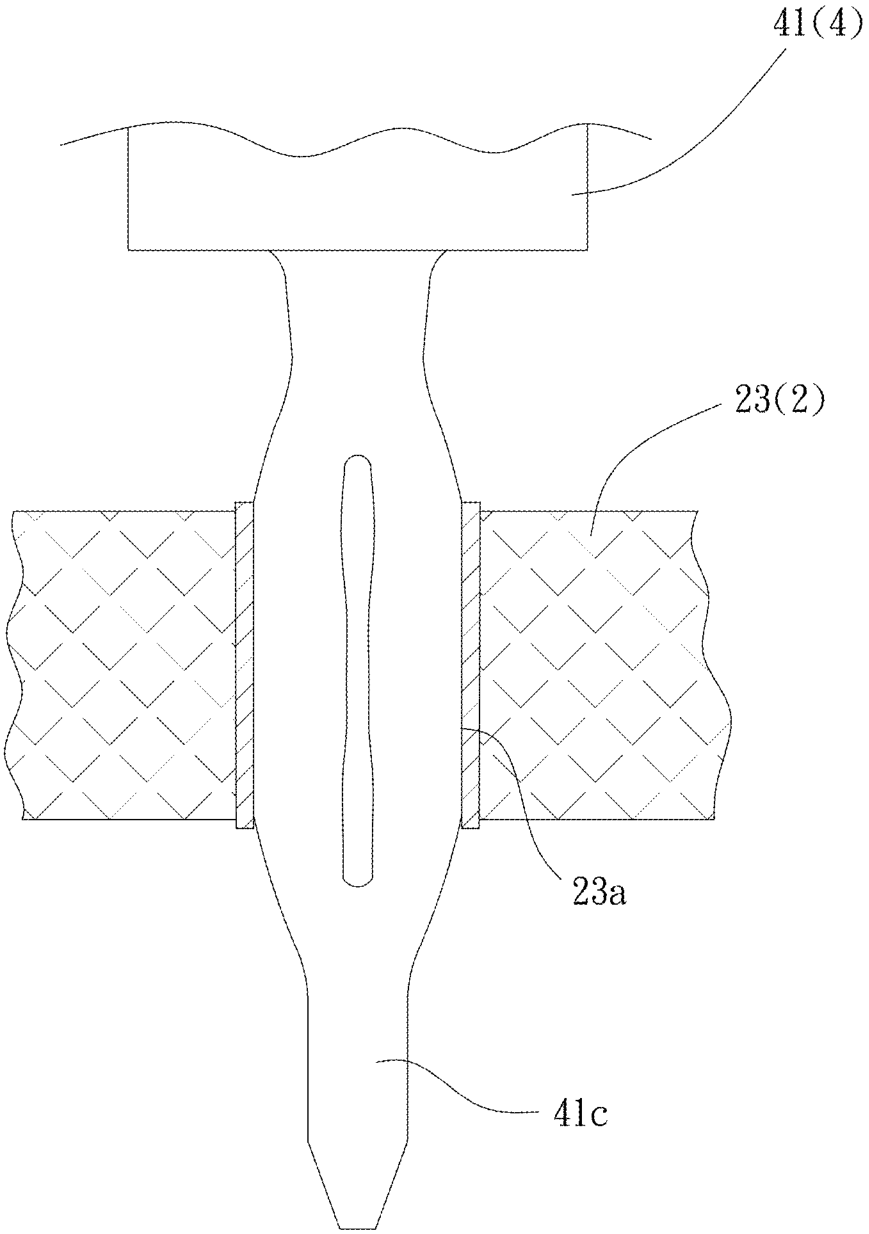
FIG. 7 is a diagrammatic view illustrating assembly of the portion of the radar structure shown in FIG. 6.

With reference to FIGS. 6 and 7, the connecting element 41 of the encapsulation cover 4 may include a plurality of press-fit terminals 41*c*. As shown in FIG. 7, the plurality of press-fit terminals 41*c* is inserted into the plurality of through-holes 23*a*. During the insertion process, the fish-eye-like portions of the plurality of press-fit terminals 41*c* are pressed by the inner peripheries of the plurality of through-holes 23*a* and deformed to be more tightly and securely coupled with the plurality of through-holes 23*a*. Furthermore, the connecting element 41 may include a plurality of pins (not shown) respectively welded to the plurality of through-holes 23*a*. Alternatively, the connection region 23 further includes a plurality of female connectors, and the plurality of pins is respectively inserted into the plurality of female connectors. The present invention is not limited to the way to electrically connect the connecting element 41 with the plurality of through-holes 23*a*.

With reference to FIG. 1, the radome 1 may further include a plurality of asymmetrically disposed alignment members 12. Correspondingly, the circuit board 2 includes a plurality of first alignment portions 24, and the shielding cover 3 includes a plurality of second alignment portions 33. By aligning the plurality of first alignment portions 24 and the plurality of second alignment portions 33 with the plurality of alignment members 12, the circuit board 2 and the shielding cover 3 can be installed in the correct position and direction. In this embodiment, the plurality of alignment members 12 is in the form of a plurality of asymmetric protrusions disposed on an inner periphery of the radome 1, whereas the plurality of first alignment portions 24 and the plurality of second alignment portions 33 are in the form of a plurality of notches respectively located in an outer periphery of the circuit board 2 and an outer periphery of the shielding cover 3. The plurality of protrusions is inserted into the plurality of notches, respectively. Nevertheless, the present invention is not limited in this regard.

Furthermore, the radome 1 may further include at least one supporting member 13 located in the receiving space S. During assembly of the circuit board 2, the at least one supporting member 13 contacts with the first surface of the circuit board 2 and supports the circuit board 2 via the first surface. Furthermore, the at least one supporting member 13 is located corresponding to an area of the connection region 23 of the circuit board 2. Moreover, the at least one supporting member 13 includes a plurality of recessed structures 13*a*. When the plurality of press-fit terminals 41*c* is inserted into the connection region 23, the plurality of press-fit terminals 41*c* is aligned with the plurality of recessed structures 13*a* of the at least one supporting member 13, such that the support and the stress imparted to the circuit board 2 are uniform. At the same time, the plurality of press-fit terminals 41*c* will not rub the at least one supporting member 13, thereby avoiding the circuit board 2 and the plurality of press-fit terminals 41*c* from deformation and damage.

In view of the foregoing, in the radar according to the present invention, the radar semi-product comprised of the radome, the circuit board, and the shielding cover provides the opening region of the shielding cover for direct and electrical connection with the connection region of the circuit board, such that the radar test can be conducted before assembly with the encapsulation cover to form the final radar product. The radar semi-product which has passed the test can continue the assembling operation, whereas the radar semi-product which has failed the test can be disassembled and the components of the radar semi-product can be replaced, thereby avoiding destruction of the circuit board and the connection terminals. This saves the manufacturing cost and enhances the testing and re-processing efficiency. Furthermore, in the radar testing method according to the present invention, by using the testing tool and the testing element to proceed with radar test on the radar semi-product, the data of assembly variation of the radar semi-product P can be measured and saved, and the data of assembly variation is the same as that of the final radar product, thereby increasing the radar test efficiency.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

What is claimed is:

1. A radar comprising:

a radome including a receiving space and a wave transmitting face;

a circuit board received in the receiving space, wherein the circuit board includes a first surface having an antenna area and facing the wave transmitting face, and wherein the circuit board further includes a second surface having a connection region;

a shielding cover disposed over the second surface of the circuit board, wherein the shielding cover includes an opening region aligned with the connection region, the opening region configured to temporarily expose the connection region to allow at least one external testing element to pass through the opening region and electrically connect to the connection region for performing a pre-assembly radar test on a semi-product consisting of the radome, the circuit board, and the shielding cover; and an encapsulation cover configured to be affixed to the radome after the semi-product passes the pre-assembly radar test, wherein the encapsulation cover includes at least one connecting element aligned with the opening region and configured to pass through the opening region to electrically connect to the connection region.

2. The radar as claimed in claim 1, wherein the radome further includes at least one alignment member, wherein the circuit board further includes at least one first alignment portion, wherein the shielding cover further includes at least one second alignment portion, and wherein the at least one alignment member is aligned with the at least one first alignment portion and the at least one second alignment portion.

3. The radar as claimed in claim 1, wherein the shielding cover further includes at least one first positioning portion, wherein the encapsulation cover further includes at least one second positioning portion, and wherein the at least one first positioning portion is aligned with the at least one second positioning portion.

4. The radar as claimed in claim 1, wherein the at least one connecting element includes a first end and a second end, wherein the first end is electrically connected to the connection region, and wherein the second end extends in a direction perpendicular to the circuit board.

5. The radar as claimed in claim 1, wherein the at least one connecting element includes a first end and a second end, wherein the first end is electrically connected to the connection region, and wherein the second end extends in a direction parallel to the circuit board.

6. The radar as claimed in claim 1, wherein the at least one connecting element includes a plurality of press-fit terminals, wherein the connection region includes a plurality of through-holes, and wherein the plurality of press-fit terminals is inserted into the plurality of through-holes.

7. The radar as claimed in claim 1, wherein the at least one connecting element includes a plurality of pins, wherein the connection region includes a plurality of female connectors, and wherein the plurality of pins is inserted into the plurality of female connectors.

8. The radar as claimed in claim 1, wherein the radome further includes at least one supporting member, wherein the at least one supporting member contacts with an area of the first surface of the circuit board corresponding to the connection region, and wherein the at least one supporting member includes a plurality of recessed structures.

9. A radar testing method comprising:

providing an external testing tool including at least one external testing element;

providing a radar semi-product comprising:

a radome including a receiving space and a wave transmitting face;

a circuit board received in the receiving space, wherein the circuit board includes a first surface having an antenna area and facing the wave transmitting face, and wherein the circuit board further includes a second surface having a connection region; and a shielding cover disposed over the second surface of the circuit board, wherein the shielding cover includes an opening region aligned with the connection region, and wherein the opening region is configured to temporarily expose the connection region to allow at least one external testing element to pass through the opening region and electrically connect to the connection region;

fixing the radar semi-product on the external testing tool;

electrically connecting the at least one external testing element to the connection region via the opening region and performing a pre-assembly radar test on a semi-product proceeding with a radar test; and after the semi-product passes the pre-assembly radar test, assembling an encapsulation cover to the radome, wherein the encapsulation cover includes at least one connecting element aligned with the opening region and configured to pass through the opening region to electrically connected to the connection region.

* * * * *